US009590787B2

(12) United States Patent
Rysgaard et al.

(10) Patent No.: US 9,590,787 B2
(45) Date of Patent: Mar. 7, 2017

(54) FEEDBACK CONTROL DURING PLANNED GAPS IN DATA STREAMS

(71) Applicant: Intel Corporation, Santa Clara, CA (US)

(72) Inventors: Bent Rysgaard, Aalborg (DK); Henrik Dalsgaard, Storvorde (DK); Jakob L. Buthler, Aalborg (DK); Carsten K. Soerensen, Nørager (DK)

(73) Assignee: Intel Corporation, Santa Clara, CA (US)

(*) Notice: Subject to any disclaimer, the term of this patent is extended or adjusted under 35 U.S.C. 154(b) by 86 days.

(21) Appl. No.: 14/315,201

(22) Filed: Jun. 25, 2014

(65) Prior Publication Data

US 2015/0381332 A1 Dec. 31, 2015

(51) Int. Cl.

| | |
|---|---|
| ***H04W 24/00*** | (2009.01) |
| ***H04L 5/00*** | (2006.01) |
| ***H04B 1/3816*** | (2015.01) |
| *H04W 24/10* | (2009.01) |
| *H04L 1/00* | (2006.01) |

(52) U.S. Cl.

CPC ......... *H04L 5/0057* (2013.01); *H04B 1/3816* (2013.01); *H04L 1/0015* (2013.01); *H04L 1/0027* (2013.01); *H04L 1/0003* (2013.01); *H04L 1/0009* (2013.01); *H04W 24/10* (2013.01)

(58) Field of Classification Search

CPC ............. H04M 1/72519; H04W 48/16; H04W 76/02; H04W 88/02

USPC .... 455/456, 557, 556.1, 558, 423, 434, 417, 455/452.1

See application file for complete search history.

(56) References Cited

U.S. PATENT DOCUMENTS

| | | | | |
|---|---|---|---|---|
| 2008/0025495 A1* | 1/2008 | Merle | ...................... | H04K 1/00 380/28 |
| 2009/0198859 A1* | 8/2009 | Orishko | ................ | G06F 13/385 710/313 |
| 2010/0203906 A1 | 8/2010 | Fang et al. | | |
| 2010/0279698 A1 | 11/2010 | Wong | | |
| 2011/0217969 A1 | 9/2011 | Spartz et al. | | |
| 2012/0039261 A1 | 2/2012 | Chin et al. | | |
| 2012/0190362 A1 | 7/2012 | Subbarayudi et al. | | |
| 2013/0065644 A1 | 3/2013 | Bishop et al. | | |
| 2013/0210484 A1 | 8/2013 | Jeenagala et al. | | |
| 2014/0036710 A1 | 2/2014 | Chin et al. | | |

(Continued)

FOREIGN PATENT DOCUMENTS

| | | | | |
|---|---|---|---|---|
| DE | 102013114650 A1 | 6/2015 | | |
| EP | WO 2014/029550 * | 2/2014 | .............. | H04L 5/00 |

OTHER PUBLICATIONS

International Search Report and Written Opinion mailed Oct. 20, 2015 for International Application No. PCT/US2015/034030, 11 pages.

(Continued)

*Primary Examiner* — Joseph Arevalo

(74) *Attorney, Agent, or Firm* — Schwabe, Williamson & Wyatt, P.C.

(57) ABSTRACT

Embodiments of the present disclosure describe systems and methods for feedback control during planned gaps in data streams. Various embodiments may include reusing a feedback measurement taken prior to a planned gap for a feedback message transmitted after the planned gap. Other embodiments may be described and/or claimed.

15 Claims, 4 Drawing Sheets

308
64 QAM
16 QAM
Idle-mode gap 304
300
52.7
52.8

(56) References Cited

U.S. PATENT DOCUMENTS

| | | | | |
|---|---|---|---|---|
| 2015/0078334 | A1* | 3/2015 | Peruru | H04W 76/02 370/331 |
| 2015/0189496 | A1* | 7/2015 | Park | H04W 8/183 455/418 |
| 2015/0229456 | A1* | 8/2015 | Wild | H04B 7/024 375/295 |

OTHER PUBLICATIONS

Ericsoon, "Dual-Sim Dual-Standby UEs and their impact on the RN", R2-115375, 3GPP TSG-RAN WG2 #75bis, Zhuhai, China, Oct. 10-14, 2011, 3 pages.

* cited by examiner

FEEDBACK CONTROL DURING PLANNED GAPS IN DATA STREAMS

FIELD

Embodiments of the present disclosure generally relate to the field of wireless communication, and more particularly, to feedback control during planned gaps in data streams.

BACKGROUND

When dual subscriber identity module (SIM) dual-standby is used in smart phones, background data from applications may make the idle (or "non-data") SIM go out of service every time data connections take place on the active (or "data") SIM. Phones that include active applications may have background data transfers taking place 46% of the time, which results in the idle SIM being unreachable a similar percentage.

To address the above-noted issues with respect to reaching an idle SIM, data versus paging (DvP) gaps have been introduced to create a gap in a data stream that enables the paging of the idle SIM. This may allow an idle SIM to remain in service and to be able to receive incoming calls during ongoing data transfers on the active SIM.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
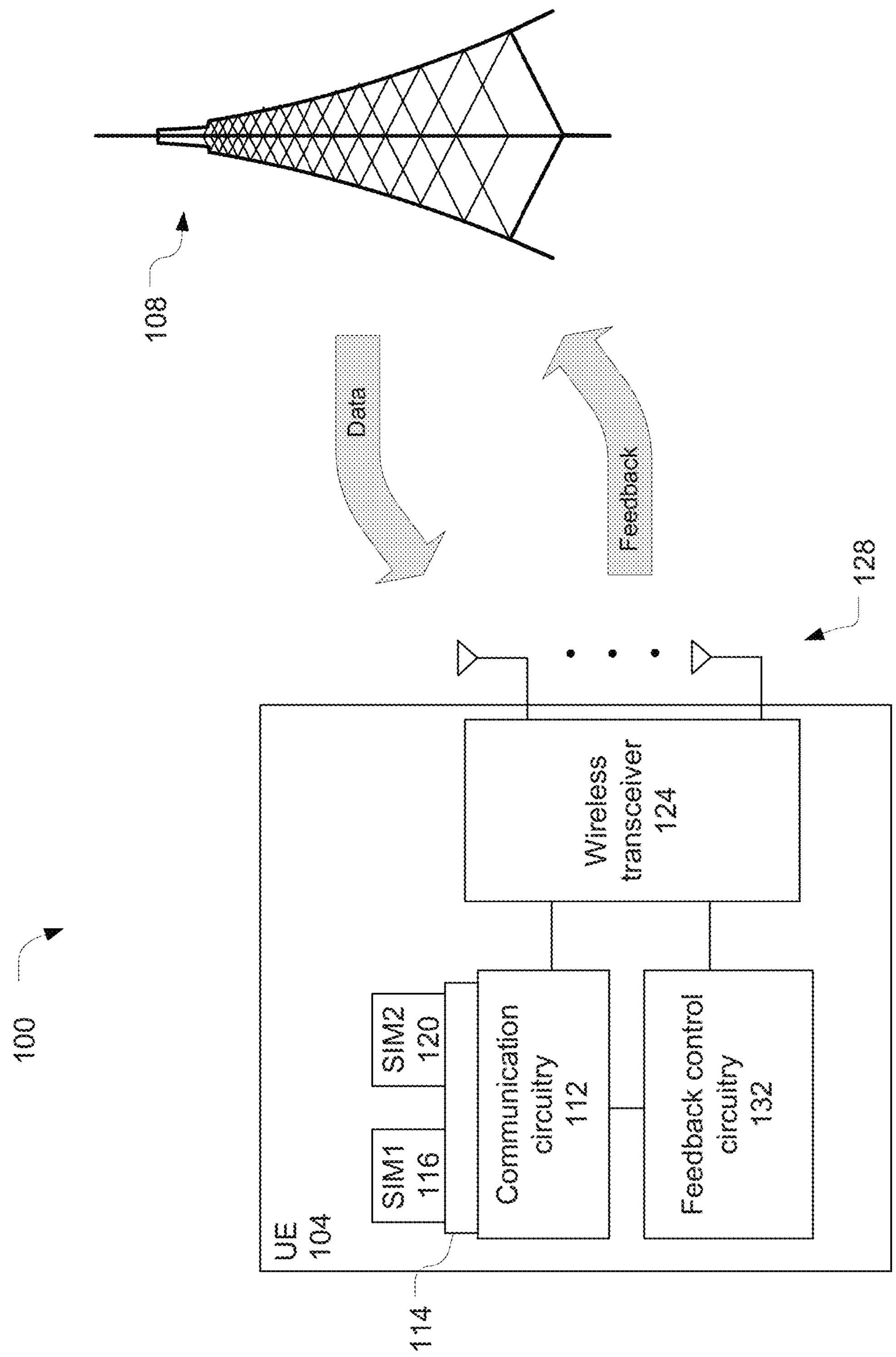
FIG. 1 schematically illustrates a wireless communication environment in accordance with various embodiments.

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

As discussed above, idle-mode gaps (for example, DvP gaps) are provided in a data stream corresponding to an active SIM so that an idle SIM may perform idle mode operations, for example, transmit/receive paging and/or other idle-mode signaling. The idle-mode gaps to read paging and/or other idle-mode signaling with respect to the idle SIM may be created by simply removing control of an antenna from the active SIM for a short period of time (for example, 20 ms to receive a paging message). From the perspective of the network, it may appear that the data SIM is simply out of service for this brief period of time.

Taking the data SIM out of service, even for a short period of time, may result in a significant decrease in data throughput. In some instances, this decrease may be up to 36%. This may be due, at least in part, to the fact that measurement reports are periodically transmitted to the network. During periods in which the active SIM is out of service, the measurement reports may indicate poor data reception, which may correlate to poor channel conditions. In response, the network may use more conservative modulation and coding schemes (MCS), which are associated with lower data throughput, so that the data may be successfully transmitted over the poor channel conditions. Therefore, the decreased data throughput may occur even after the idle-mode gap.

Embodiments of the present disclosure provide feedback control mechanisms that will enable a faster return to full data throughput following an idle-mode gap. Since the idle-mode gaps have a well-known length, the communication system may get faster back into full data transfer speed by sending one measurement report as soon as the idle-mode gap is over. Instead of letting the measurement report be based on the measurements performed during the idle-mode gap, the measurement report may instead be based on the radio performance just prior to the idle-mode gap. This may correspond to the best description/measurement of the actual radio conditions.

FIG. 1 schematically illustrates a wireless communication environment 100 in accordance with various embodiments. The environment 100 may include a user equipment (UE) 104 in wireless communication with an access node such as enhanced node B (eNB) 108. The eNB 108 may be part of a 3rd Generation Partnership Project (3GPP) long-term evolution (LTE) network (or an LTE-Advanced (LTE-A) network). In particular, the eNB 108 may be part of a radio access network (RAN) of the LTE/LTE-A network, such as an evolved universal terrestrial radio access network (E-UTRAN). The E-UTRAN may be coupled with a core network such as an Evolved Packet Core (EPC) that performs various management and control functions of the LTE/LTE-A network and further provides a communication interface between various RANs and other networks.

The UE 104 may include communication circuitry 112 that is configured to provide communication services for a plurality of subscriber identity modules (SIMs) with which it is coupled. The plurality of SIMs may be coupled with the communication circuitry 112 through a SIM port 114. The plurality of SIMs includes, for example, SIM1 116 and SIM2 120. The SIMs may be integrated circuits that securely store subscriber identity information such as international mobile subscriber identity (IMSI) and related keys used to identify and authenticate one or more subscribers using the UE 104. Each SIM may be associated with different subscriber identity information and may or may not be associated with different carriers. In some embodiments, the SIMs may be removably coupled with the communication circuitry 112. In other embodiments, the SIMs may be hardware and/or firmware that is permanently coupled with the UE 104. In various embodiments, the SIMs may include full-size SIMs, mini-SIMs, micro-SIMs, nano-SIMs, embedded SIMs, and/or virtual SIMs.

The communication circuitry 112 may transmit and receive data and control signals through a wireless transceiver 124 that provides various amplification, up/down converting, and filtering functions. The wireless transceiver 124 may facilitate over-the-air communication via one or more antennas 128.

The UE 104 may further include feedback control circuitry 132 coupled with the communication circuitry 112 and/or the wireless transceiver 124. The feedback control circuitry 132 may, in general, control the feedback measurements and reporting performed by the UE 104. For example, the feedback control circuitry 132 may perform a variety of channel measurements during receipt of a data stream from the eNB 108 in a downlink channel to measure a quality of the channel. The feedback control circuitry 132 may determine the appropriate feedback information based on these channel measurements. For example, the feedback control circuitry 132 may measure signal-to-interference-plus-noise ratio (SINR) and select a channel quality indicator (CQI) to indicate a data rate that can be supported by the channel in light of the SINR and characteristics of the wireless transceiver 124. The feedback information may then be transmitted in uplink channel to the eNB 108.

While SINR is discussed as the channel measurements, other embodiments may additionally/alternatively perform other channel measurements such as, but not limited to, block error rate, frame error rate, bit error rate, etc.

Figure 2:
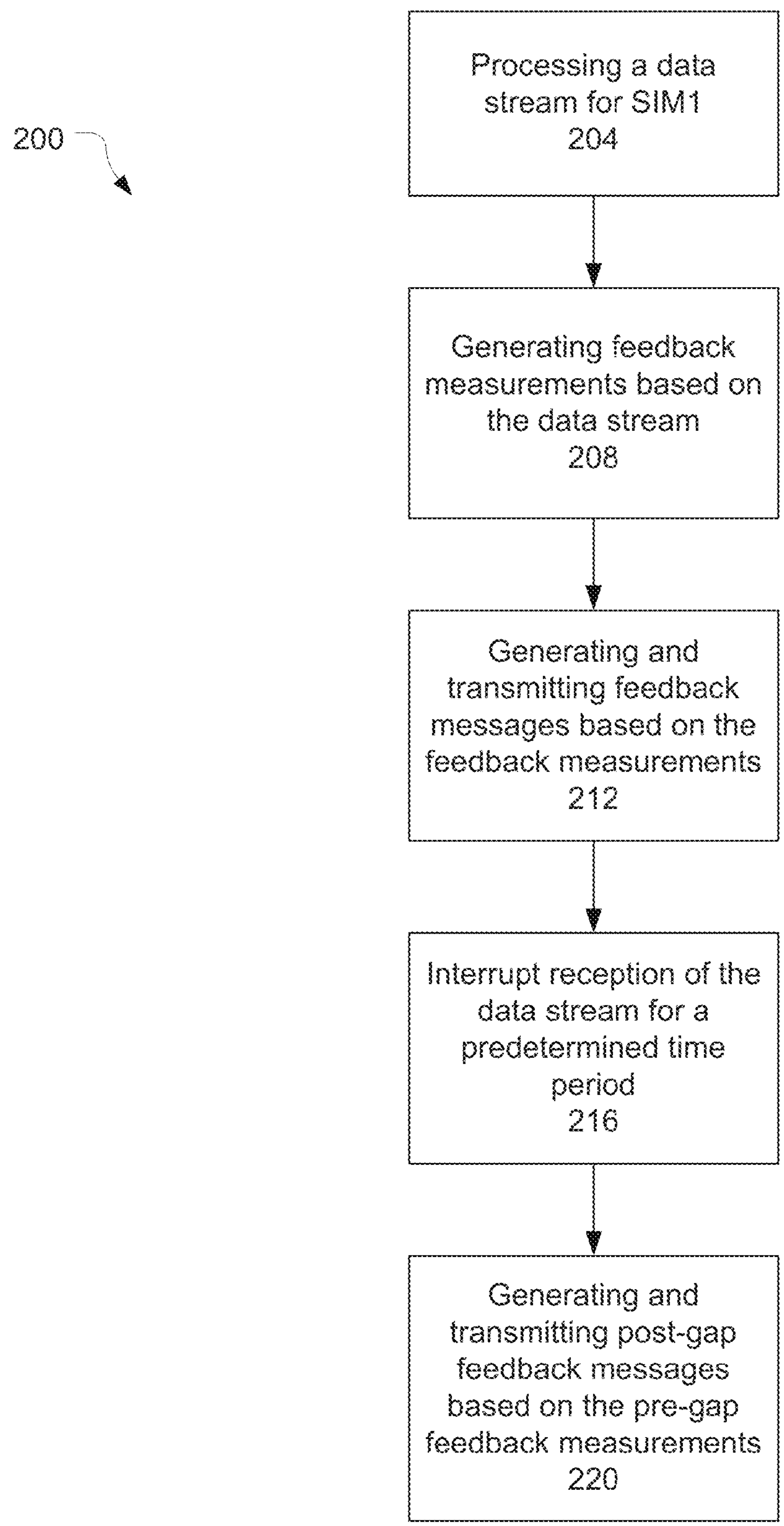
FIG. 2 is a flowchart illustrating a feedback control method in accordance with various embodiments.

FIG. 2 is a flowchart 200 illustrating a feedback control method in accordance with some embodiments. The feedback control method may be performed by communication circuitry 112 and/or feedback control circuitry 132.

The feedback control method may include, at 204, processing a data stream for a first SIM, for example, SIM1 116. The data stream may be a downlink data stream received at the UE 104 from a RAN transmission point. In various embodiments, the RAN transmission point may be the eNB 108, a remote radio head (RRH) controlled by the eNB 108, or some other network entity. The processing of the data stream may be done by the communication circuitry 112 and may include a variety of signal processing operations such as, but not limited to, demodulating, decoding, etc.

The feedback control method may include, at 208, generating feedback measurements based on the data stream. The generating of the feedback measurements may be done by the feedback control circuitry 132. In some embodiments, the feedback measurements may be SINR measurements that are conducted based on the received data stream. In some embodiments, the SINR measurements may be conducted on control or reference signals embedded in the data stream.

The feedback control method may further include, at 212, generating and transmitting feedback messages based on the feedback measurements. The generating and transmitting feedback messages may be performed by the feedback control circuitry 132. The feedback control circuitry may employ other circuitry, such as communication circuitry 112, wireless transceiver 124, and/or antennas 128, to effect the transmission of the feedback messages. In some embodiments, the feedback control circuitry 132 may generate the feedback message such that it includes an indicator, for example, a channel quality indicator (CQI), to provide an indication that a channel has a particular channel condition.

The feedback control circuitry 132 may select a CQI index that corresponds to a particular modulation, code rate, and efficiency that is appropriate in light of the feedback measurements. For example, if the channel is associated with a high SINR, the feedback control circuitry 132 may select a high CQI index, for example, fifteen, which corresponds to a 64 quadrature amplitude modulation (QAM) with a code rate of 948×1024 and an efficiency of 5.5547. If the channel is associated with a low SINR, the feedback control circuitry 132 may select a low CQI index, for example, one, which corresponds to quadrature phase shift keying (QPSK) modulation with the code rate of 78×1024 and an efficiency of 0.1523. In some embodiments, the CQI may be a four-bit value that corresponds to a CQI index as shown in table 7.2.3-1 of 3GPP Technical Specification (TS) 36.213 V12.41.0 (2014-03).

In some embodiments, the feedback control circuitry 132 may cooperate with the communication circuitry 112 to transmit the feedback message. In various embodiments, the feedback message may be transmitted on a physical uplink control channel (PUCCH) or a physical uplink shared channel (PUSCH).

The feedback control method may further include, at 216, interrupting reception of the data stream. The interrupting of the reception may be done by the communication circuitry 112 for the benefit of a second SIM, for example, SIM2 120. Reception may be interrupted for a predetermined time period, which may also be referred to as the idle-mode gap, in order to attempt to transmit/receive an idle-mode message, for example, a paging message, a received signal strength indication (RSSI) measurement message, a neighbor cell RSSI measurement message, a cell broadcast message, or a neighbor cell system information message, for an idle SIM, for example, SIM2 120. The communication circuitry 112 may have advanced knowledge of when these idle-mode gaps are to occur and for how long. This may allow the communication circuitry 112 to be synchronized with the network entity transmitting the idle-mode messages.

The interrupting of the reception may be done by the communication circuitry 112 removing control of receive-chain components, which may reside in the wireless transceiver 124 and antennas 128, from the SIM1 116 and providing control of the receive-chain components to the SIM2 120. Control of receive-chain components by a SIM may mean that the SIM will have direct control over the components or, more likely, that the communication circuitry 112 will control the receive-chain components to process communications associated with the SIM.

Following the interrupting of the reception for the predetermined time period, the feedback control method may further include, at 220, generating a post-idle-mode gap feedback message based on pre-idle-mode gap feedback measurements. For example, if a high SINR is measured prior to the idle-mode gap, resulting in a high CQI index, for example, fifteen, being communicated in a feedback message, following the idle-mode gap, the feedback control circuitry 132 may generate another feedback message that includes a CQI index of fifteen and may transmit that feedback message to indicate that the channel condition within or after the idle-mode gap is the same as it was prior to the idle-mode gap. Thus, the feedback message transmitted after the interruption of reception of the data stream will be based on a measurement that took place prior to the interruption rather than after the interruption. In this manner, one or more channel feedback measurements may be reused to indicate a condition of a channel during, or immediately following, an idle-mode gap is the same as a condition of the channel prior to the idle-mode gap.

Figure 3:
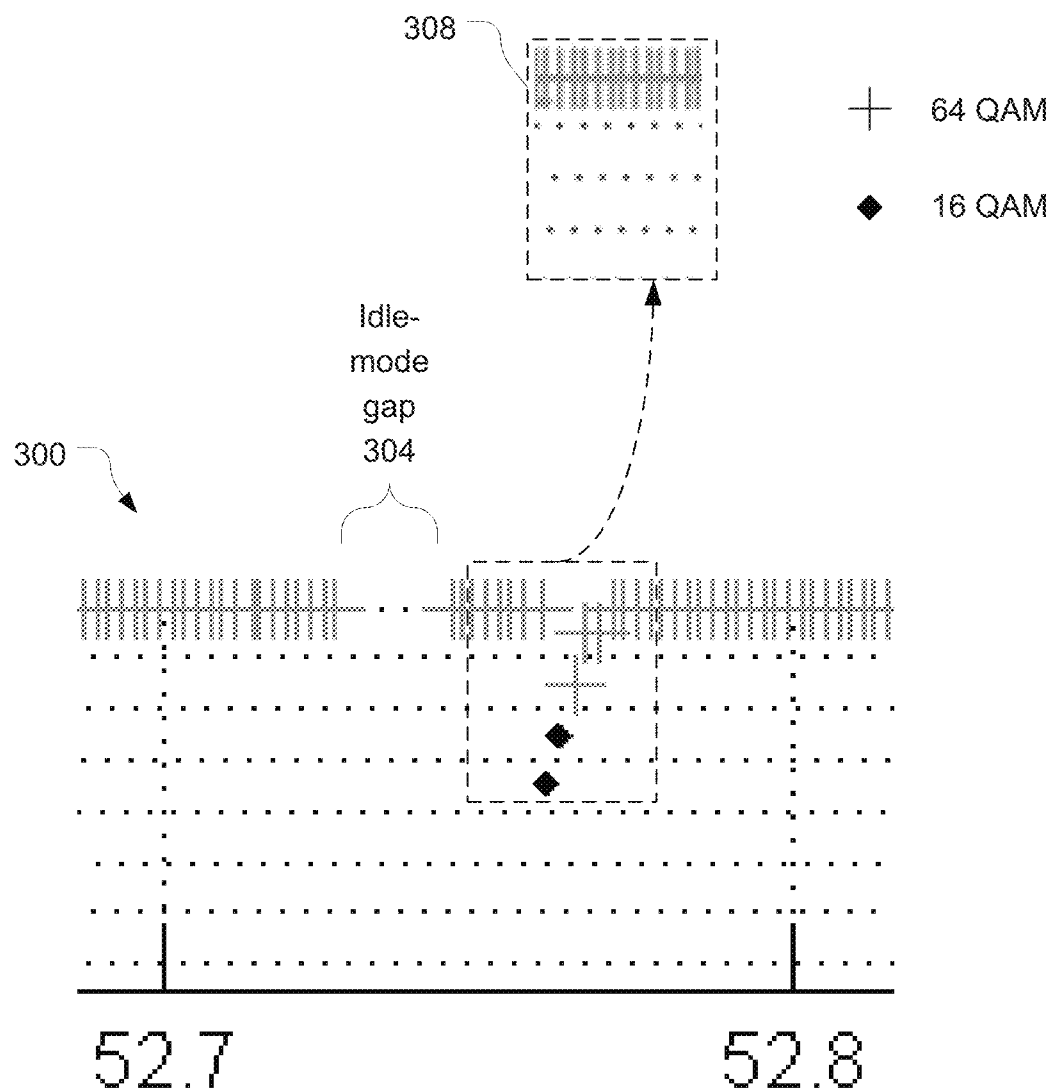
FIG. 3 illustrates a channelization coding graph in accordance with various embodiments.

FIG. 3 illustrates channelization coding graph 300 in accordance with an embodiment of the present invention. The graph 300 provides a visual indication of a modulation scheme for each packet of a data stream for a first SIM. The packets transmitted before an idle-mode gap 304 may have a 64 QAM, which may be associated with a relatively high network efficiency (with network efficiency increasing in a vertical direction on the graph 300). During the idle-mode gap 304, no packets may be received in the data stream. Following the idle-mode gap 304, a typical protocol may send feedback measurements that reflect a poor channel condition (based, for example, on non-receipt of data packets during the idle-mode gap 304), which may cause the eNB to determine that the channel condition has deteriorated and a more conservative modulation is required. As a result, packets transmitted after the idle-mode gap 304 may have 16 QAM, which may be associated with a relatively low network efficiency (reflected by the packets being positioned lower on the graph 300). The drop in modulation scheme is shown to occur after a period of time from the idle-mode gap 304 due to feedback delay. After a certain number of packets are received by the UE at the reduced modulation scheme, five shown, the modulation scheme may recover to a full speed 64-QAM.

This is in contrast to embodiments of the present disclosure. Callout 308 shows the channelization coding following the idle-mode gap 304 in accordance with embodiments of the present disclosure. The callout 308 shows a steady use of the high-efficiency modulation scheme, that is, 64 QAM. This is accomplished because feedback measurements that correspond to the idle-mode gap 304 are indicated to have a channel condition that is the same as the channel condition that occurred prior to the idle-mode gap 304. Therefore, the eNB does not determine that the channel condition has deteriorated and move to a more conservative modulation scheme. Rather, the five packets will be able to transfer data at the higher efficiency modulation scheme.

Figure 4:
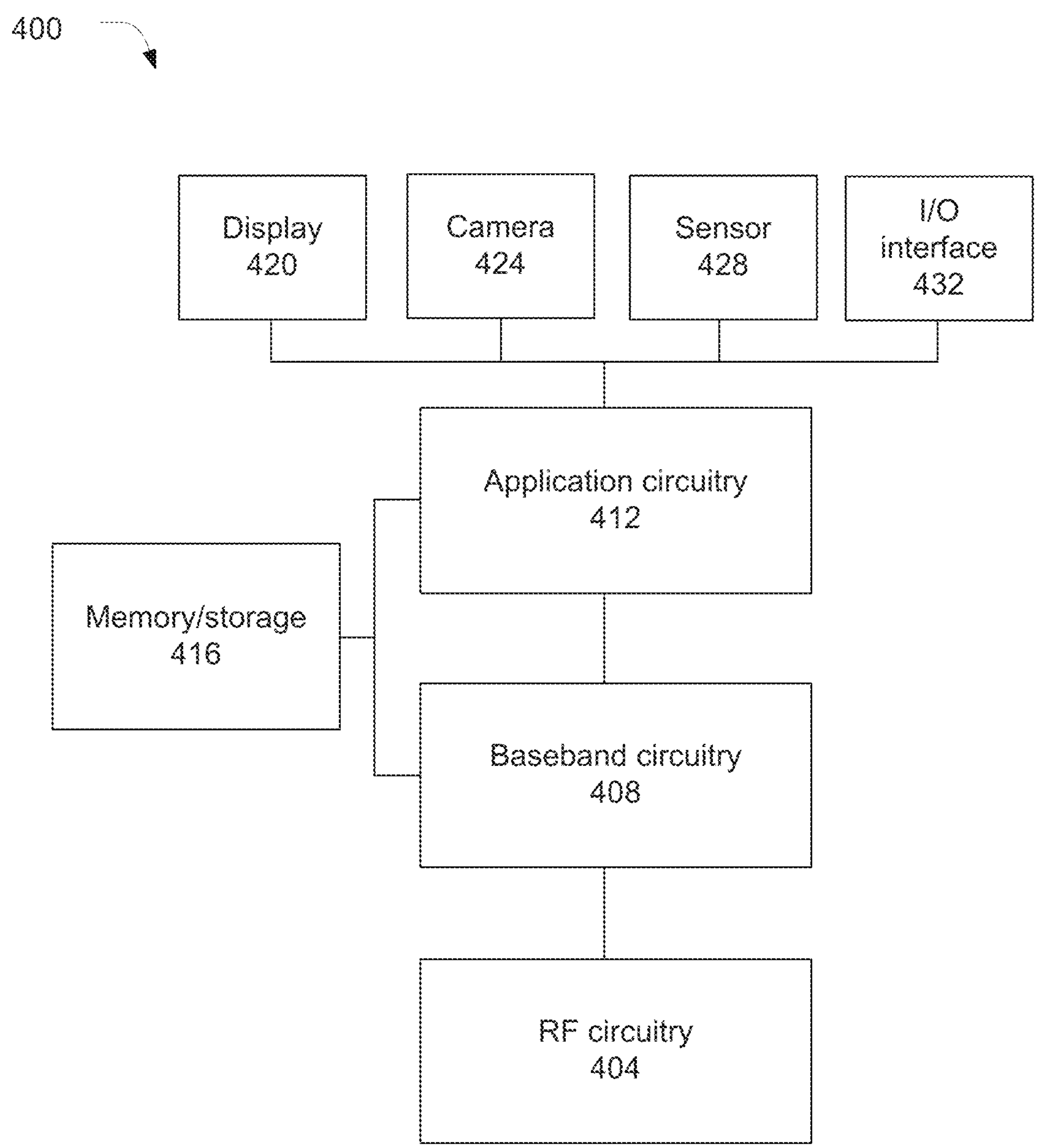
FIG. 4 is a block diagram of an example computing device that may be used to practice various embodiments described herein.

The UE 104 as described herein may be implemented into a system using any suitable hardware, firmware, and/or software configured as desired. FIG. 4 illustrates, for one embodiment, an example system 400 comprising radio frequency (RF) circuitry 404, baseband circuitry 408, application circuitry 412, memory/storage 416, display 420, camera 424, sensor 428, and input/output (I/O) interface 432, coupled with each other at least as shown.

The application circuitry 412 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 416 and configured to execute instructions stored in the memory/storage 416 to enable various applications and/or operating systems running on the system 400.

The baseband circuitry 408 may include circuitry such as, but not limited to, one or more single-core or multi-core processors. The processor(s) may include a baseband processor. The baseband circuitry 408 may handle various radio control functions that enable communication with one or more radio networks via the RF circuitry 404. The radio control functions may include, but are not limited to, signal modulation, encoding, decoding, radio frequency shifting, etc. In some embodiments, the baseband circuitry 408 may provide for communication compatible with one or more radio technologies. For example, in some embodiments, the baseband circuitry 408 may support communication with an E-UTRAN and/or other wireless metropolitan area networks (WMAN), a wireless local area network (WLAN), or a wireless personal area network (WPAN). Embodiments in which the baseband circuitry 408 is configured to support radio communications of more than one wireless protocol may be referred to as multi-mode baseband circuitry.

In various embodiments, baseband circuitry 408 may include circuitry to operate with signals that are not strictly considered as being in a baseband frequency. For example, in some embodiments, baseband circuitry 408 may include circuitry to operate with signals having an intermediate frequency, which is between a baseband frequency and a radio frequency.

In some embodiments, the communication circuitry 112 and/or the feedback control circuitry 132 may be embodied in the application circuitry 412 and/or the baseband circuitry 408.

RF circuitry 404 may enable communication with wireless networks using modulated electromagnetic radiation through a non-solid medium. In various embodiments, the RF circuitry 404 may include switches, filters, amplifiers, etc., to facilitate the communication with the wireless network.

In various embodiments, RF circuitry 404 may include circuitry to operate with signals that are not strictly considered as being in a radio frequency. For example, in some embodiments, RF circuitry 404 may include circuitry to operate with signals having an intermediate frequency, which is between a baseband frequency and a radio frequency.

In some embodiments, the wireless transceiver 124 may be embodied in the RF circuitry 404.

In some embodiments, some or all of the constituent components of the baseband circuitry 408, the application circuitry 412, and/or the memory/storage 416 may be implemented together on a system on a chip (SOC).

Memory/storage 416 may be used to load and store data and/or instructions, for example, for system 400. Memory/storage 416 for one embodiment may include any combination of suitable volatile memory (e.g., dynamic random access memory (DRAM)) and/or non-volatile memory (e.g., Flash memory).

In various embodiments, the I/O interface 432 may include one or more user interfaces designed to enable user interaction with the system 400 and/or peripheral component interfaces designed to enable peripheral component interaction with the system 400. User interfaces may include, but are not limited to, a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, sensor 428 may include one or more sensing devices to determine environmental conditions and/or location information related to the system 400. In some embodiments, the sensors may include, but are not limited to, a gyro sensor, an accelerometer, a proximity sensor, an ambient light sensor, and a positioning unit. The positioning unit may also be part of, or interact with, the baseband circuitry 408 and/or RF circuitry 404 to communicate with components of a positioning network, e.g., a global positioning system (GPS) satellite.

In various embodiments, the display 420 may include a display (e.g., a liquid crystal display, a touch screen display, etc.).

In various embodiments, the system 400 may be a mobile computing device such as, but not limited to, a laptop computing device, a tablet computing device, a netbook, an ultrabook, a smartphone, etc. In various embodiments, system 400 may have more or fewer components, and/or different architectures.

The following paragraphs describe examples of various embodiments.

Example 1 includes user equipment (UE) circuitry comprising: communication circuitry to: process a data stream for a first subscriber identity module (SIM), the data stream received from a radio access network (RAN) transmission point; and interrupt reception of the data stream for a first time period to attempt to transmit or receive an idle-mode message for a second SIM; feedback control circuitry, coupled with the communication circuitry, to: generate, based on first feedback measurements, a first feedback message to indicate that a channel has a first channel condition prior to the first time period; and generate, based on the first feedback measurements, a second feedback message to indicate that the channel has the first channel condition within or after the first time period.

Example 2 includes the UE circuitry of example 1, wherein the feedback circuitry is to: perform the first feedback measurements prior to the first time period; and transmit the first feedback message prior to the first time period.

Example 3 includes the UE circuitry of example 2, wherein the feedback circuitry is to: transmit the second feedback message during the first time period or after the first time period.

Example 4 includes the UE circuitry of example 1, wherein the first feedback message includes a first channel quality indicator (CQI) to indicate that the channel has the first channel condition prior to the first time period and the second feedback message includes the first CQI to indicate that the channel also has the first channel condition within or after the first time period.

Example 5 includes the UE circuitry of example 4, wherein the first CQI is a four-bit value that corresponds to a first CQI index.

Example 6 includes the UE circuitry of example 5, wherein the first CQI index is associated with a modulation scheme and a coding rate.

Example 7 includes the UE circuitry of any of examples 1-6, wherein the idle-mode message is a paging message, a received signal strength indication (RSSI) measurement message, a neighbor cell RSSI measurement message, a cell broadcast message, or a neighbor cell system information message.

Example 8 includes a method for providing feedback messages, the method comprising: processing a data stream for a first subscriber identity module (SIM); generating a feedback measurement based on the data stream; generating and transmitting a feedback message based on the feedback measurement; interrupting, after generating the feedback measurement, reception of the data stream for a predetermined period of time for a second SIM; and generating and transmitting a second feedback message, after said interrupting, based on the feedback measurement.

Example 9 includes the method of example 8, wherein generating the feedback message based on the feedback measurement comprises: selecting a channel quality indicator (CQI) based on the feedback measurement.

Example 10 includes the method of example 9, wherein the feedback measurement is a signal-to-interference-plus-noise ratio (SINR), a received signal strength indication (RSSI) measurement, or a neighbor cell RSSI measurement.

Example 11 includes the method of example 9, wherein selecting the CQI comprises: selecting the CQI to indicate a CQI index that corresponds to a modulation scheme and a code rate.

Example 12 includes the method of example 8, wherein interrupting reception of the data stream comprises: removing control of receive-chain components from the first SIM and providing control of the receive-chain components to the second SIM for the predetermined period of time.

Example 13 includes the method of example 12, wherein providing control of the receive-chain components to the second SIM comprises: attempting to receive or transmit one or more idle-mode messages for the second SIM.

Example 14 includes one or more non-transitory computer readable media having instructions, that when executed, cause a user equipment (UE) to: identify an idle-mode gap within a data stream for a first subscriber identity module (SIM) of the UE that is to allow for idle-mode operations for a second SIM of the UE; and generate a post-idle-mode gap feedback message based on a pre-idle-mode gap feedback measurement, wherein the post-idle-mode gap feedback message is to indicate a quality of a wireless communication channel after the idle-mode gap.

Example 15 includes the one or more non-transitory computer readable media of example 14, wherein the idle-mode gap is a data versus paging gap configured to allow receipt of a paging message directed to the second SIM.

Example 16 includes the one or more non-transitory computer readable media of example 14, wherein the instructions, when executed, further cause the UE to:

generate the post-mode gap feedback message to include a channel quality indicator (CQI).

Example 17 includes the one or more non-transitory computer readable media of example 16, wherein the CQI corresponds to a CQI index associated with a modulation scheme and a coding rate.

Example 18 includes the one or more non-transitory computer readable media of any of examples 14-17, wherein the instructions, when executed, further cause the UE to: generate a pre-idle-mode gap feedback message; and transmit the pre-idle-mode gap feedback message to a radio access node transmission point prior to the idle-mode gap.

Example 19 includes a user equipment (UE) comprising: a subscriber identity module (SIM) port to receive a plurality of SIMs; communication circuitry coupled with the SIM port to: process a data stream for a first SIM coupled with the SIM port; provide an idle-mode gap to allow reception or transmission of an idle-mode message for a second SIM coupled with the SIM port; and feedback control circuitry coupled with the communication circuitry and configured to re-use a channel feedback measurement to indicate a condition of a wireless communication channel during the idle-mode gap is the same as a condition of the wireless communication channel prior to the idle-mode gap.

Example 20 includes the UE of example 19, wherein the feedback control circuitry is to transmit a feedback message, via the communication circuitry, to an eNB to provide a channel quality indicator based on the reused channel feedback measurement.

Example 21 includes a user equipment (UE) comprising: means to identify an idle-mode gap within a data stream for a first subscriber identity module (SIM) of the UE that is to allow for idle-mode operations for a second SIM of the UE; and means to generate a post-idle-mode gap feedback message based on a pre-idle-mode gap feedback measurement, wherein the post-idle-mode gap feedback message is to indicate a quality of a wireless communication channel after the idle-mode gap.

Example 22 includes the UE of example 21, wherein the idle-mode gap is a data versus paging gap configured to allow receipt of a paging message directed to the second SIM.

Example 23 includes the UE of example 21, wherein the UE further comprises: means to generate the post-mode gap feedback message to include a channel quality indicator (CQI).

Example 24 includes the UE of example 23, wherein the CQI corresponds to a CQI index associated with a modulation scheme and a coding rate.

Example 25 includes the UE of any of examples 21-24, further comprising: means to generate a pre-idle-mode gap feedback message; and means to transmit the pre-idle-mode gap feedback message to a radio access node transmission point prior to the idle-mode gap.

The description herein of illustrated implementations, including what is described in the Abstract, is not intended to be exhaustive or to limit the present disclosure to the precise forms disclosed. While specific implementations and examples are described herein for illustrative purposes, various equivalent modifications are possible within the scope of the disclosure, as those skilled in the relevant art will recognize. These modifications may be made to the disclosure in light of the above detailed description.

What is claimed is:

1. User equipment (UE) circuitry comprising:
communication circuitry to:
process a data stream for a first subscriber identity module (SIM), the data stream received from a radio access network (RAN) transmission point; and
interrupt reception of the data stream for a first time period to attempt to transmit or receive an idle-mode message for a second SIM; and
feedback control circuitry, coupled with the communication circuitry, to:
generate, based on first feedback measurements, a first feedback message to indicate that a channel has a first channel condition prior to the first time period; and
generate, based on the first feedback measurements, a second feedback message to indicate that the channel has the first channel condition within or after the first time period,
wherein the first feedback message includes a first channel quality indicator (CQI) to indicate that the channel has the first channel condition prior to the first time period and the second feedback message includes the first CQI to indicate that the channel also has the first channel condition within or after the first time period.

2. The UE circuitry of claim 1, wherein the feedback control circuitry is to:
perform the first feedback measurements prior to the first time period; and
transmit the first feedback message prior to the first time period.

3. The UE circuitry of claim 2, wherein the feedback control circuitry is to:
transmit the second feedback message during the first time period or after the first time period.

4. The UE circuitry of claim 1, wherein the first CQI is a four-bit value that corresponds to a first CQI index.

5. The UE circuitry of claim 4, wherein the first CQI index is associated with a modulation scheme and a coding rate.

6. The UE circuitry of claim 1, wherein the idle-mode message is a paging message, a received signal strength indication (RSSI) measurement message, a neighbor cell RSSI measurement message, a cell broadcast message, or a neighbor cell system information message.

7. A method comprising:
processing a data stream for a first subscriber identity module (SIM);
generating a feedback measurement based on the data stream;
generating and transmitting a feedback message based on the feedback measurement;
interrupting, after generating the feedback measurement, reception of the data stream for a predetermined period of time for a second SIM; and
generating and transmitting a second feedback message, after said interrupting, based on the feedback measurement,
wherein generating the feedback message based on the feedback measurement comprises: selecting, based on the feedback measurement, a channel quality indicator (CQI) to indicate a CQI index that corresponds to a modulation scheme and a code rate.

8. The method of claim 7, wherein the feedback measurement is a signal-to-interference-plus-noise ratio (SINR), a received signal strength indication (RSSI) measurement, or a neighbor cell RSSI measurement.

9. The method of claim 7, wherein interrupting reception of the data stream comprises:
removing control of receive-chain components from the first SIM and providing control of the receive-chain components to the second SIM for the predetermined period of time.

10. The method of claim 9, wherein providing control of the receive-chain components to the second SIM comprises:
attempting to receive or transmit one or more idle-mode messages for the second SIM.

11. One or more non-transitory computer readable media having instructions, that when executed, cause a user equipment (UE) to:
identify an idle-mode gap within a data stream for a first subscriber identity module (SIM) of the UE that is to allow for idle-mode operations for a second SIM of the UE; and
generate a post-idle-mode gap feedback message based on a pre-idle-mode gap feedback measurement, wherein the post-idle-mode gap feedback message is to indicate a quality of a wireless communication channel after the idle-mode gap,
wherein the post-idle-mode gap feedback message is to include a channel quality indicator (CQI) that corresponds to a CQI index associated with a modulation scheme and a coding rate.

12. The one or more non-transitory computer readable media of claim 11, wherein the idle-mode gap is a data versus paging gap configured to allow receipt of a paging message directed to the second SIM.

13. The one or more non-transitory computer readable media of claim 11, wherein the instructions, when executed, further cause the UE to:

generate a pre-idle-mode gap feedback message; and transmit the pre-idle-mode gap feedback message to a radio access node transmission point prior to the idle-mode gap.

14. A user equipment (UE) comprising:

a subscriber identity module (SIM) port to receive a plurality of SIMs;

communication circuitry coupled with the SIM port to:

process a data stream for a first SIM coupled with the SIM port;

provide an idle-mode gap to allow reception or transmission of an idle-mode message for a second SIM coupled with the SIM port; and feedback control circuitry coupled with the communication circuitry and configured to reuse a channel feedback measurement to indicate a condition of a wireless communication channel during the idle-mode gap is the same as a condition of the wireless communication channel prior to the idle-mode gap, wherein the feedback control circuitry is to transmit a post-idle-mode gap feedback message that includes a channel quality indicator (CQI) that corresponds to a CQI index associated with a modulation scheme and a coding rate.

15. The UE of claim 14, wherein the feedback control circuitry is to transmit a feedback message, via the communication circuitry, to an eNB to provide a channel quality indicator based on the reused channel feedback measurement.

* * * * *